(12) United States Patent
Eckhoff

(10) Patent No.: US 6,216,807 B1
(45) Date of Patent: Apr. 17, 2001

(54) DRIVE SYSTEM FOR TRACKED VEHICLES

(75) Inventor: Detlev Eckhoff, Martensrade (DE)

(73) Assignee: MaK System Gesellschaft mbH, Kiel (DE)

( * ) Notice: Subject to any disclaimer, the term of this patent is extended or adjusted under 35 U.S.C. 154(b) by 0 days.

(21) Appl. No.: 09/216,158

(22) Filed: Dec. 18, 1998

(30) Foreign Application Priority Data

Dec. 19, 1997 (DE) .............................. 197 56 683

(51) Int. Cl.$^7$ ..................................... B62D 11/22
(52) U.S. Cl. ........................... 180/6.7; 180/9.32
(58) Field of Search .............. 305/107; 180/6.7, 180/9.1, 9.21, 9.23, 9.32

(56) References Cited

U.S. PATENT DOCUMENTS

| | | | |
|---|---|---|---|
| 4,554,989 | * 11/1985 | Gruich et al. ................... | 180/65.4 |
| 4,809,803 | * 3/1989 | Ahern et al. ..................... | 180/65.4 |
| 4,998,591 | * 3/1991 | Zaunberger ...................... | 180/6.44 |
| 5,162,707 | * 11/1992 | Joseph ............................. | 318/60 |
| 5,195,600 | * 3/1993 | Dorgan ............................ | 180/9.1 |
| 5,289,100 | * 2/1994 | Joseph ............................. | 318/799 |
| 5,799,743 | * 9/1998 | Robinson ......................... | 180/9.1 |

FOREIGN PATENT DOCUMENTS 19537945  4/1997 (DE) .

* cited by examiner

Primary Examiner—Lanna Mai
Assistant Examiner—Andrew J. Fischer
(74) Attorney, Agent, or Firm—Nils H. Ljungman & Associates

(57) ABSTRACT

A drive system for tracked vehicles has the drive engine and the electrical generator combined into one modular drive unit. The elements of the drive motor and generator can be integrated in the drive units in the form of modules. There are at least two drive units that are located one on each side of the vehicle housing in the vicinity of the chain or track shoulders.

10 Claims, 2 Drawing Sheets

DRIVE SYSTEM FOR TRACKED VEHICLES

BACKGROUND OF THE INVENTION

1. Field of the Invention

The present invention relates to a drive system for tracked vehicles in the form of an electrical drive system, whereby a drive engine is coupled with an electrical generator to supply power to electric motors and whereby the electric motors are associated with sprocket wheels and can be interconnected and adjusted by means of control devices.

2. Background Information

German Patent No. 195 37 945 A1 discloses a known electrical drive system for tracked vehicles, whereby sprocket wheels or track drive wheels are associated with electric motors.

One general problem with drive concepts for tracked vehicles is the realization of increasing armor protection requirements against the effects of bombardments and fragmentation. These requirements relate in particular to armored vehicles, whereby essentially drive systems located in the front of the vehicle are used to achieve a wide area for the crew to exit at the rear of the vehicle. With increasing protection requirements, this arrangement results in ever increasing vehicle gross weights, because the entire drive unit, with the crew compartment behind it, must be located in the protected area of the vehicle housing. The crew's forward visibility is also adversely affected, on account of the longer front section of the vehicle.

OBJECT OF THE INVENTION

The object of the present invention, on a generic layout with electrical drive mechanisms, is to make more efficient utilization of the protected interior of the vehicle and to place parts of the crew quarters relatively far forward in the forward part of the vehicle.

SUMMARY OF THE INVENTION

The present invention teaches that this object can be accomplished if there are at least two drive units, each drive unit can have a drive engine and generator, and there can be one drive unit on each side of the vehicle housing in the vicinity of the track shoulders, track guards, or in other words fenders, above the tracks.

This arrangement has the advantage that the central portions of the front and rear areas can be kept substantially free of drive components, which makes possible the following advantages:

- the realization of a wide exit area for the crew in the rear of the vehicle,
- the reduction of the mobility kill in the event of a hit in the front portion of the vehicle,
- in other words, in at least one embodiment of the present invention, damage to the front portion of the tracked vehicle can lead to lessened decrease in mobility than in a standard configuration,
- an improved view of the ground for the crew toward the front, and better weapons placements in the forward portion of the vehicle,
- reduced probability of thermal detection ahead in the direction of primary threat, because none or essentially none of the hot or heat generating drive components are installed in the nose of the vehicle,
- the use of standardized drive modules for a whole family of vehicles, because within certain limits, a large number of installation sites are available on the vehicle, and smaller units can be realized,
- in other words, this modular construction can have the benefit of having standardized drive modules, which can be smaller than comparable drives, which standardized drive modules can be installed in any of a number of vehicles, which vehicles have a variety of installation sites and available spaces for installation of the drive modules,
- the combination of standardized drive modules that can be subdivided into a few modular power classes and can be used to achieve a plurality of drive systems of different power classes,
- the realization of a substantially uniform or standardized layout of the drive system in different vehicles, because the drive modules are not installed in the core areas of the vehicle (center, front or rear).

The present invention teaches that in at least one favorable configuration, each drive unit is associated with and is located in or about the rear vehicle housing, in the vicinity of the track shoulders or fenders above the tracks.

In other words, in at least one preferable embodiment of the present invention, the vehicle can have at least two drive units, with at least one of the drive units associated with each side of the vehicle and the track on the side of the vehicle. The units can be located in the vehicle housing in the vicinity of the track shoulders or fenders, and can also be located essentially above the tracks.

To make possible a flexible adaptation to meet the requirements of the corresponding different configurations, the present invention teaches that the elements of the drive motor and of the generator can be integrated into each of the drive units in the form of modules.

The present invention further teaches that the drive motor and the generator can be located one behind the other, whereby the generator can be in front of the drive motor in the direction of travel.

To maintain operational readiness even in the event of the failure of individual assemblies, the invention teaches that the elements of the drive unit located on both sides of the vehicle housing can be connected to one another by means of electronic control units.

In other possible embodiments of the present invention, the units on opposite sides of the vehicle can be connected by mechanical or other possible structures to one another to possibly control one another or, in possible embodiments, to provide power to one another.

To essentially guarantee a combination of individual subassemblies that corresponds to the specific requirements and makes easy replacement possible, the invention teaches that each drive unit can be constructed with its elements in the form of a modular system.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable arid non-obvious one with respect to the other.

BRIEF DESCRIPTION OF THE DRAWINGS

The accompanying drawings are schematic illustrations of one exemplary embodiment of the invention, in which.

DESCRIPTION OF THE PREFERRED EMBODIMENT

Figure 1:
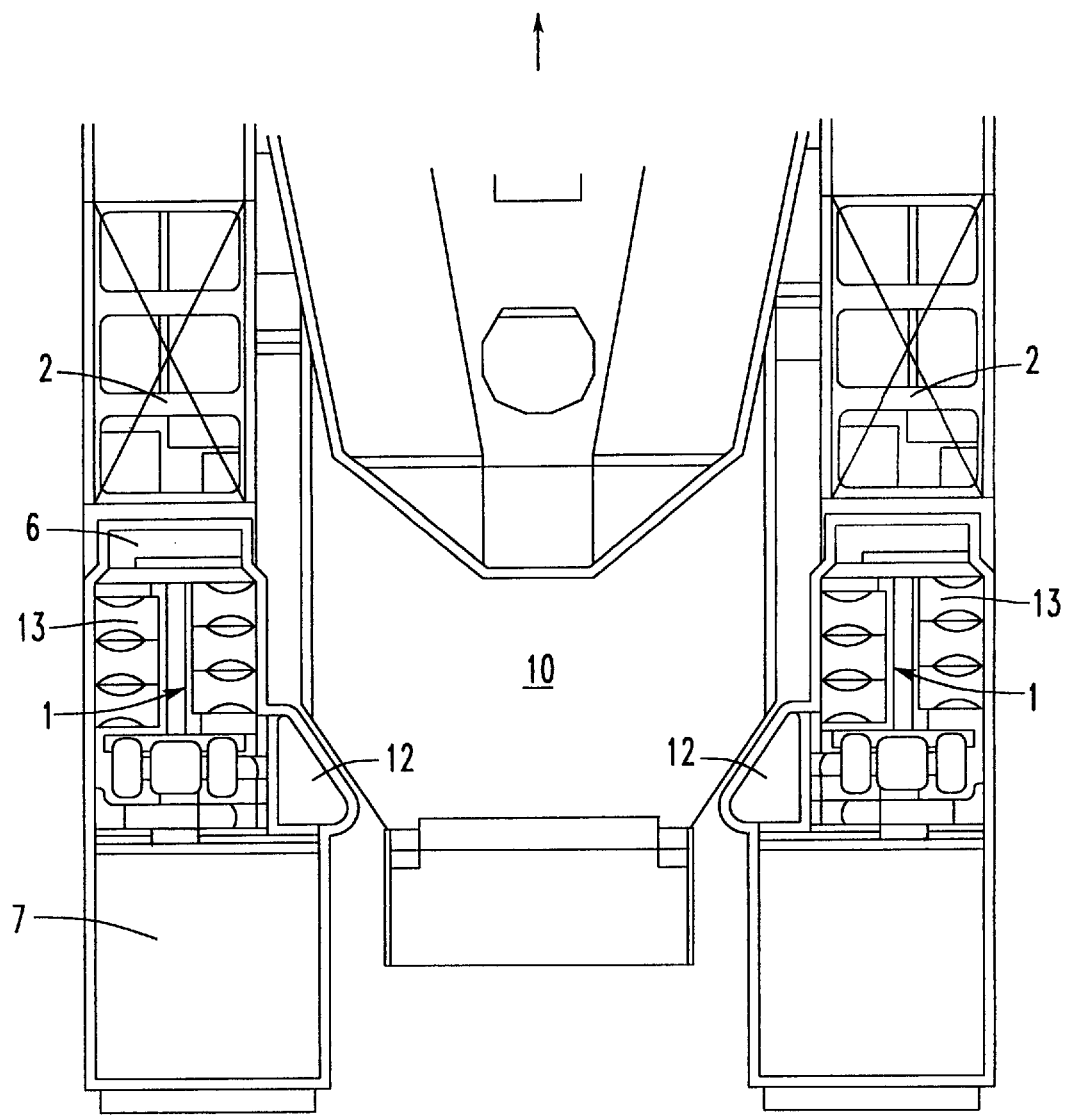
FIG. 1 is a plan view of the rear portion of a tracked vehicle.
Figure 2:
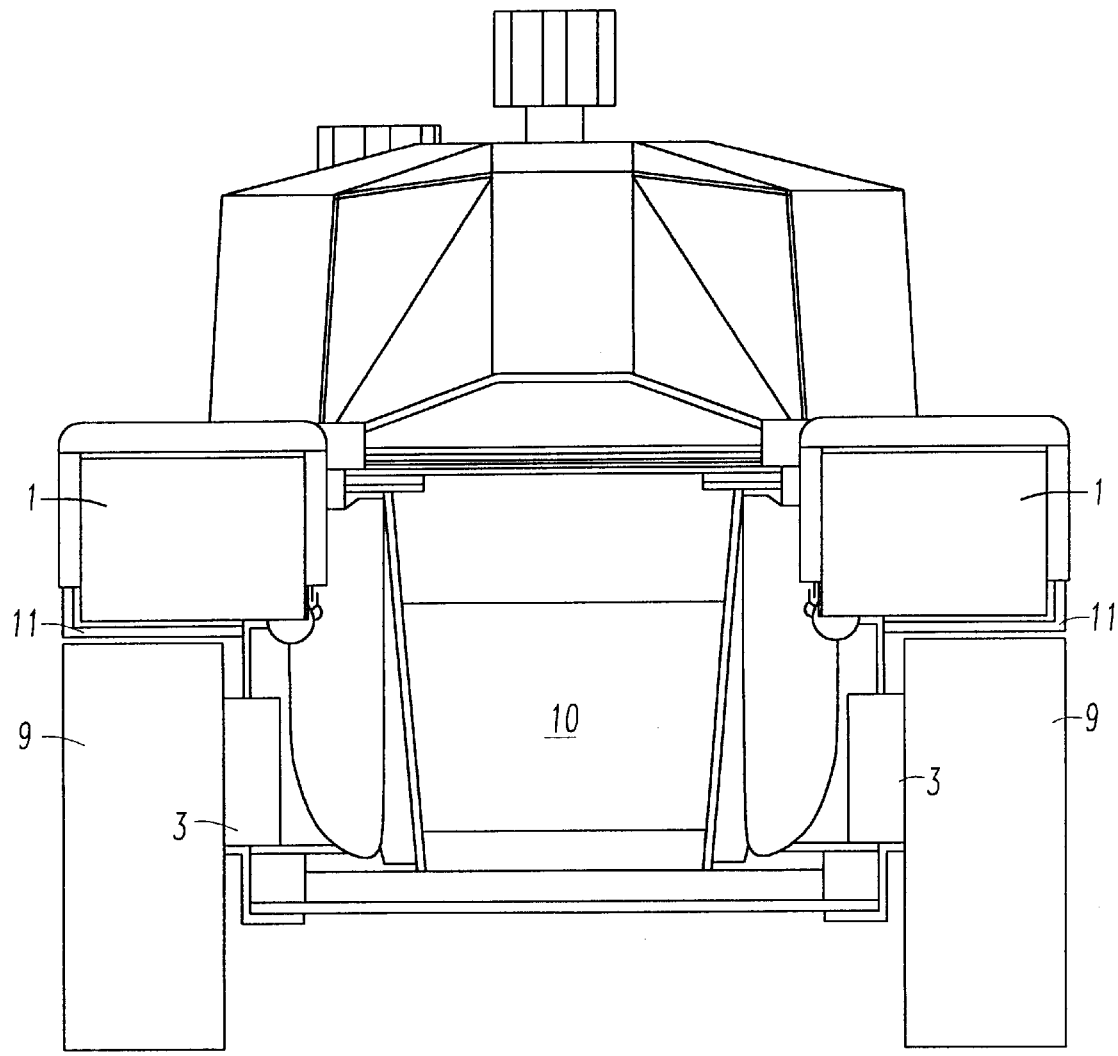
FIG. 2 is a rear view of a tracked vehicle.

On the tracked vehicles in the accompanying FIGS. 1 and 2, there are drive tracks 9, one on either side of a vehicle housing 10, whereby the drive tracks 9 can be driven with electric motors by means of corresponding drive mechanisms 3 or motors.

The drive mechanisms 3 can be supplied by cable, for example, from a drive unit 1 that includes, for example, a Diesel engine 13 with an electrical generator 6, and which drive mechanisms 3 can be located on both sides of the vehicle housing 10 in the rear portion of the chain shoulders, track shoulders or fenders 11.

The track shoulders 11 can, for example, be disposed substantially about at least a portion of the drive tracks 9 to protect the drive tracks 9 and/or separate the drive tracks 9 from the housing or body 10.

The drive unit 1 can have a modular construction, and along with the Diesel engine 13 and the generator 6, also can include all the additional units such as the radiator 7, air intake 12 and an electronic unit or electronic control unit 2 that has a standardized interface to the cooling system and the electrical connections, and is designed so that it can be replaced easily, if necessary. The electronic control unit 2 can thereby be located in front of the generator 6.

The drive units 1 on each side can be connected to one another by means of the electronic unit 2, so that emergency operation can be maintained in the event of the failure of one of the units 1.

The present invention can be used in tracked vehicles such as armored combat tanks, armored personnel carriers (APC's), troop carriers or other self-propelled vehicles. The present invention can be further utilized in similar vehicles having similar functions.

One feature of the invention resides broadly in the drive system for tracked vehicles in the form of an electrical drive system, whereby a drive engine is coupled with an electrical generator to supply power to electric motors, and the electric motors are associated with sprocket wheels or track drive wheels and can be connected and adjusted by means of control devices, characterized by the fact that there are at least two drive units 1 with drive engine 13 and generator 6, and one drive unit 1 is located on each side of the vehicle housing 10, each in the vicinity of the chain shoulders 11 above the tracks 9.

Another feature of the invention resides broadly in the drive system characterized by the fact that each drive unit 1 is associated with and is located in the rear vehicle housing 10, in the vicinity of the track shoulders or fenders 11 above the tracks 9.

Yet another feature of the invention resides broadly in the drive system characterized by the fact that the elements of the drive engine 13 and of the generator 6 are integrated in the form of modules into each drive unit 1.

Still another feature of the invention resides broadly in the drive system characterized by the fact that the drive engine 13 and generator 6 are located one behind the other, whereby the generator 6 is in front of the drive engine 13 in the direction of travel.

A further feature of the invention resides broadly in the drive system characterized by the fact that the elements of the drive unit 1 located on both sides of the vehicle housing 10 can be connected to one another by means of electronic control units.

Another feature of the invention resides broadly in the drive system characterized by the fact that each drive unit 1 is constructed with its elements in the form of a modular system.

The components disclosed in the various publications, disclosed or incorporated by reference herein, may be used in the embodiments of the present invention, as well as, equivalents thereof.

U.S. patent application Ser. No. 08/993,486, filed on Dec. 18, 1997, having the inventors Zonak and Rostel, is hereby incorporated by reference as if set forth in its entirety herein.

Some examples of hybrid engines and control systems therefor which may be utilized in accordance with embodiments of the present invention may be disclosed in the following U.S. Pat. No. 4,305,254 to Kawakatsu et al. on Dec. 15, 1981, entitled "Control Apparatus and Method for Engine/Electric Hybrid Vehicle"; and U.S. Pat. No. 4,335,429 to Kawakatsu on Jun. 15, 1982, entitled "Control Apparatus for Engine/Electric Hybrid Vehicle".

Some examples of electric motors which can be operated as generators which may be utilized in accordance with embodiments of the present invention may be disclosed in the following U.S. Pat. No. 5,327,992 to Boll on Jul. 12, 1994, entitled "Method for Controlling a Hybrid Drive Which Drives a Vehicle"; U.S. Pat. No. 5,249,637 to Heidi et al. on Oct. 5, 1993, entitled "Hybrid Vehicle"; and U.S. Pat. No. 5,323,743 to Kristiansson on Jun. 28, 1994, entitled "Sure-start Device for Internal Combustion Engine".

Some examples of generators which can be operated as motors which may be utilized in accordance with embodiments of the present invention may be disclosed in the following U.S. Pat. No. 5,272,379 to Sugiyama et al. on Dec. 21, 1993, entitled "Power Supply Device for an Electric Vehicle"; U.S. Pat. No. 5,283,471 to Raad on Feb. 1, 1994, entitled "DC Generator and Back-up Engine Starting Apparatus"; and U.S. Pat. No. 5,281,905 to Dhyanchand et al. on Jan. 25, 1994, entitled "Induction Machine Based Hybrid Aircraft Engine Starting/Generating Power System".

Examples of hybrid drive arrangements, such as internal combustion engine-electric generator arrangements, and components associated therewith, such as control arrangements and individual motors for driving corresponding wheels, may be found in the following U.S. Patents which may be utilized in embodiments of the present invention: U.S. Pat. No. 5,327,987, which issued to Abdelmalek on Jul. 12, 1994; U.S. Pat. No. 5,318,142, which issued to Bates et al. on Jun. 7, 1994; U.S. Pat. No. 5,301,764, which issued to Gardner on Apr. 12, 1994; U.S. Pat. No. 5,249,637, which issued to Heidi et al. on Oct. 5, 1993; U.S. Pat. No. 5,176,213, which issued to Kawai et al. on Jan. 5, 1993; U.S. Pat. No. 5,327,992, which issued to Boll on Jul. 12, 1994; U.S. Pat. No. 5,291,960, which issued to Brandenburg et al. on Mar. 8, 1994; and U.S. Pat. No. 5,264,764, which issued to Kuang on Nov. 23, 1993.

Examples of electric and hybrid vehicles, and related components, may be disclosed in the following U.S. Pat. No. 5,251,721 entitled "Semi-hybrid Electric Automobile" to Ortenheim; U.S. Pat. No. 5,004,061 entitled "Electrically Powered Motor Vehicle" to Andruet; U.S. Pat. No. 5,289,100 entitled "System for Powering, Speed Control, Steering, and Braking" to Joseph; U.S. Pat. No. 5,265,486 entitled "Portable External Drive Assembly" to AAMCO Corporation; U.S. Pat. No. 5,289,890 entitled "Drive Unit for Electric Motor Vehicle" to Aisin; and U.S. Pat. No. 5,310,387 entitled "Differential Motor Drive" to Hughes Aircraft Company.

Additional examples of electric vehicles containing components which may be utilized in embodiments of the present invention may be disclosed in the following U.S. Pat. No. 5,166,584 entitled "Electric Vehicle" to Nissan; U.S. Pat. No. 5,161,634 entitled "Electric Vehicle" to Kubota Corporation; and U.S. Pat. No. 5,150,045 entitled "Electric Automobile" to Kaisha.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 197 56 683.9, filed on Dec. 19, 1997, having inventor Detler Eckhoff, and DE-OS 197 56 683.9 and DE-PS 197 56 683.9, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A combat tank, said combat tank comprising:
   an armored body;
   a compartment to house personnel for operating said combat tank;
   said compartment being configured and disposed to be at least partially surrounded by said armored body;
   first and second drive tracks configured to move said combat tank;
   said first and second drive tracks being disposed on opposite sides of said combat tank;
   a drive system to move said combat tank;
   said drive system comprising:
      a first drive unit and a second drive unit;
      said first drive unit comprising:
         a first electric motor being configured and disposed to drive said first drive track;
         a first electric generator being configured to supply electric power to said first electric motor; and
         a first engine to drive said first electric generator to supply electric power to said first electric motor; and
      said second drive unit comprising:
         a second electric motor being configured and disposed to drive said second drive track;
         a second electric generator being configured to supply electric power to said second electric motor; and
         a second engine to drive said second electric generator to supply electric power to said second electric motor;
      said first and second drive units being disposed on opposite sides of said compartment;
      said first drive unit being disposed at least partially above said first drive track;
      said second drive unit being disposed at least partially above said second drive track;
   first and second track shoulders;
   said first track shoulder being disposed at least partially above said first drive track;
   said second track shoulder being disposed at least partially above said second drive track;
   said first drive unit being disposed substantially above said first track shoulder;
   said second drive unit being disposed substantially above said second track shoulder;
   a control system;
   said control system being disposed and configured to control said first and second electric motors;
   first and second sprocket wheels;
   said first sprocket wheel being disposed and configured to drive said first drive track;
   said second sprocket wheel being disposed and configured to drive said second drive track;
   said first electric motor being disposed and configured to drive said first sprocket wheel to drive said first drive track;
   said second electric motor being disposed and configured to drive said second sprocket wheel to drive said second drive track;
   said armored body comprising a rear portion;
   said first and second drive units being disposed in said rear portion of said armored body;
   said first engine and said first electric generator forming a first modular unit;
   said first modular unit being a component of said first drive unit;
   said second engine and said second electric generator forming a second modular unit; and
   said second modular unit being a component of said second drive unit.

2. The combat tank according to claim 1, wherein:
   said combat tank comprises a front portion, said front portion being in the front of said combat tank during a forward direction of travel of said combat tank;

said first electric generator is disposed in front of said first engine during a forward direction of travel of said combat tank; and said second electric generator is disposed in front of said first engine during a forward direction of travel of said combat tank.

3. The combat tank according to claim 2, said combat tank further comprising:

at least one electronic control unit; and said at least one electronic control unit is disposed and configured to connect said first and second drive units to each other.

4. The combat tank according to claim 3, wherein:

said first drive unit comprises a first modular system; and said second drive unit comprises a second modular system.

5. A tracked vehicle, said tracked vehicle comprising:

a body;

a compartment to house personnel for operating said tracked vehicle;

said compartment being configured and disposed to be at least partially surrounded by said body;

first and second drive tracks configured to move said tracked vehicle;

said first and second drive tracks being disposed on opposite sides of said tracked vehicle;

a drive system to move said tracked vehicle;

said drive system comprising:

a first drive unit and a second drive unit;

said first drive unit comprising:

a first electric motor being configured and disposed to drive said first drive track;

a first electric generator being configured to supply electric power to said first electric motor; and a first engine to drive said first electric generator to supply electric power to said first electric motor; and said second drive unit comprising:

a second electric motor being configured and disposed to drive said second drive track;

a second electric generator being configured to supply electric power to said second electric motor; and a second engine to drive said second electric generator to supply electric power to said second electric motor;

said first and second drive units being disposed on opposite sides of said compartment;

said first drive unit being disposed at least partially above said first drive track;

said second drive unit being disposed at least partially above said second drive track;

first and second track shoulders;

said first track shoulder being disposed at least partially above said first drive track;

said second track shoulder being disposed at least partially above said second drive track;

said first drive unit being disposed substantially above said first track shoulder; and said second drive unit being disposed substantially above said second track shoulder;

a control system;

said control system being disposed and configured to control said first and second electric motors;

first and second sprocket wheels;

said first sprocket wheel being disposed and configured to drive said first drive track;

said second sprocket wheel being disposed and configured to drive said second drive track;

said first electric motor being disposed and configured to drive said first sprocket wheel to drive said first drive track;

said second electric motor being disposed and configured to drive said second sprocket wheel to drive said second drive track;

said armored body comprising a rear portion;

said first and second drive units being disposed in said rear portion of said armored body;

said first engine and said first electric generator forming a first modular unit;

said first modular unit being a component of said first drive unit;

said second engine and said second electric generator forming a second modular unit; and said second modular unit being a component of said second drive unit.

6. The tracked vehicle according to claim 5, wherein:

said tracked vehicle comprises a front portion, said front portion being in the front of said tracked vehicle during a forward direction of travel of said tracked vehicle;

said first electric generator is disposed in front of said first engine during a forward direction of travel of said tracked vehicle; and said second electric generator is disposed in front of said first engine during a forward direction of travel of said tracked vehicle.

7. The tracked vehicle according to claim 6, said tracked vehicle further comprising:

at least one electronic control unit; and said at least one electronic control unit is disposed and configured to connect said first and second drive units to each other.

8. The tracked vehicle according to claim 7, wherein:

said first drive unit comprises a first modular system;

said second drive unit comprises a second modular system; and said tracked vehicle comprises a combat tank.

9. A drive system for moving a tracked vehicle, said drive system comprising:

first and second drive tracks being configured to move a tracked vehicle;

said first and second drive tracks being configured to be disposed on opposite sides of a tracked vehicle;

a first drive unit and a second drive unit;

said first drive unit comprising:

a first electric motor being configured and disposed to drive said first drive track;

a first electric generator being configured to supply electric power to said first electric motor; and a first engine to drive said first electric generator to supply electric power to said first electric motor;

said second drive unit comprising:

a second electric motor being configured and disposed to drive said second drive track;

a second electric generator being configured to supply electric power to said second electric motor; and a second engine to drive said second electric generator to supply electric power to said second electric motor;

said first drive unit being disposed at least partially above said first drive track;

said second drive unit being disposed at least partially above said second drive track;

a control system;

said control system being disposed and configured to control said first and second electric motors;

first and second sprocket wheels;

said first sprocket wheel being disposed and configured to drive said first drive track;

said second sprocket wheel being disposed and configured to drive said second drive track;

said first electric motor being disposed and configured to drive said first sprocket wheel to drive said first drive track;

said second electric motor being disposed and configured to drive said second sprocket wheel to drive said second drive track;

said first and second drive units being configured to be disposed in a rear section of a tracked vehicle;

said first engine and said first electric generator forming a first modular unit;

said first modular unit being a component of said first drive unit;

said second engine and said second electric generator forming a second modular unit; and said second modular unit being a component of said second drive unit.

10. The drive system according to claim 9, wherein:

said first electric generator is configured to be disposed ahead of said first drive engine in a front section of a tracked vehicle;

said second electric generator is configured to be disposed ahead of said second drive engine in a front section of a tracked vehicle;

said drive system further comprises at least one electronic control unit;

said at least one electronic control unit is disposed and configured to connect said first and second drive units to each other;

said first drive unit comprises a first modular system; and said second drive unit comprises a second modular system.

* * * * *

UNITED STATES PATENT AND TRADEMARK OFFICE
CERTIFICATE OF CORRECTION

PATENT NO. : 6,216,807 B1
DATED : April 17, 2001
INVENTOR(S) : Detlev Eckhoff

Page 1 of 1

It is certified that error appears in the above-identified patent and that said Letters Patent is hereby corrected as shown below:

<u>Column 2,</u>
Line 63, after 'patentable', delete "arid" and insert -- and --.

Signed and Sealed this

Twelfth Day of March, 2002

Attest:

Attesting Officer

JAMES E. ROGAN
*Director of the United States Patent and Trademark Office*